United States Patent Office 3,390,133
Patented June 25, 1968

3,390,133
CROSS-LINKED POLYMERS AND THE PROCESS
FOR THEIR PREPARATION
David S. Breslow, Munich, Germany, assignor to Hercules
Incorporated, a corporation of Delaware
No Drawing. Filed Apr. 13, 1965, Ser. No. 447,905
16 Claims. (Cl. 260—75)

ABSTRACT OF THE DISCLOSURE

Unsaturated polymers can be cross-linked with polyfunctional nitrones having the general formulae

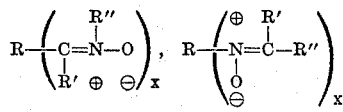

and

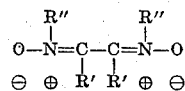

where R is a radical selected from the group consisting of alkylene, cycloalkylene, arylene, arylene-dialkylene, alkylene-diarylene, cycloalkylene-dialkylene and arylene-dicarbonyl; R' is a radical selected from the group consisting of hydrogen, alkyl, aryl, alkaryl and aralkyl; R" is a radical selected from the group consisting of alkyl, aryl, alkaryl and aralkyl; and $x$ is an integer greater than 1.

This invention relates to cross-linking unsaturated polymers and to the cross-linked products so produced. More particularly, it relates to cross-linking unsaturated polymers with polyfunctional nitrones, and to the resulting cross-linked products.

Cross-linking systems heretofore proposed for use in vulcanizing unsaturated polymers all have certain undesirable features. Generally, prior art curing systems work only at elevated temperatures, and their curing action is inhibited by air and moisture.

In accordance with this invention, it has been found that unsaturated polymers can be cross-linked with polyfunctional nitrones to produce tough, solvent resistant, cross-linked products. This cross-linking procedure can be carried out at moderate temperatures, and is not affected by air or moisture.

The polyfunctional nitrones used in this invention have the formula selected from the group consisting of:

I.  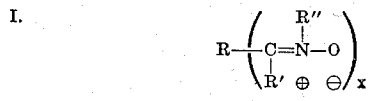

II. 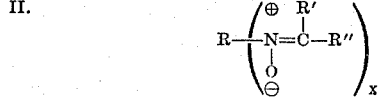

and

III. 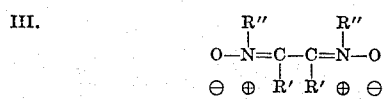

wherein R is an organic radical selected from the group consisting of alkylene radicals, such as methylene, dimethylene, trimethylene, tetramethylene, pentamethylene, hexamethylene, heptamethylene, decamethylene, dodecamethylene, octadecamethylene, and the like; cycloalkylene radicals such as cyclohexylene, cyclopentylene, cyclobutylene, cyclooctylene, and the like; arylene radicals, such as o-, m-, and p-phenylene, naphthylene, and the like; arylene-dialkylene radicals such as o-, m- and p-xylylene, o-, m- and p-phenylene diethylene, and the like; alkylene-diarylene radicals such as methylene bis (o-, m- and p-phenylene), ethylene bis(o-, m- and p-phenylene), and the like; cycloalkylene-dialkylene radicals such as 1,2-, 1,3- or 1,4-cyclohexane-dimethylene, 1,2- or 1,3-cyclopentane-dimethylene, and the like; and arylene-dicarbonyl radicals such as phenylene dicarbonyl, methylene bis(o-, m- and p-phenylene dicarbonyl), and the like; R' is an inert radical selected from the group consisting of hydrogen, alkyl radicals containing one to ten carbon atoms, such as methyl, ethyl, butyl, hexyl and decyl radicals, aryl radicals such as phenyl and halo-or alkoxy-substituted aryl radicals (for example, o-, m- and p-chlorophenyl and o-, m- and p-methoxy- or ethoxy-phenyl radicals), alkaryl radicals having from 1–20 carbon atoms in the alkyl group, such as methylphenyl and octadecylphenyl radicals, and aralkyl radicals having 1–20 carbon atoms in the alkyl group and 1–3 rings in the aryl group, such as benzyl, naphthyldimethylene radicals, and the like; R" is selected from the group consisting of alkyl radicals containing 1–20 carbon atoms such as methyl, ethyl, propyl, hexyl and octadecyl radicals, and the like, cycloalkyl radicals such as cyclohexyl, cyclopentyl, and the like, aryl radicals having 1–3 rings such as phenyl, naphthyl and anthryl radicals, and alkaryl and aralkyl radicals as described above in connection with R'; and $x$ is an integer greater than 1.

The maximum value of $x$ in the above formula will depend on the number of carbon atoms in R, since $x$ cannot exceed the valence of R. Preferably, $x$ is an integer from 2 to 10.

Of particular interest in this invention are the bis (nitrones) having general Formula I wherein $x=2$, i.e., those having the formula IV. 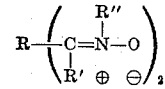

wherein R, R' and R" are as defined above.

Exemplary of the polyfunctional nitrones which can be used in the cross-linking process of this invention are bis(nitrones) such as terephthalaldehyde bis(N-phenylnitrone), isophthalaldehyde bis(N-phenylnitrone), isophthalaldehyde bis(N-methylnitrone), terephthalaldehyde bis(N-butylnitrone), isophthalaldehyde bis(N-cyclododecylnitrone), isophthalaldehyde bis(N-cyclohexylnitrone), malonaldehyde bis(N-phenylnitrone), succinaldehyde bis(N-ethylnitrone), succinaldehyde bis(N-phenylnitrone), glutaraldehyde bis(N-phenylnitrone), phenylene bis(glyoxal N-phenylnitrone), hexahydroterephthalaldehyde bis(N-phenylnitrone), hexahydroisophthalaldehyde bis(N-phenylnitrone), p,p'-diphenylmethane dialdehyde bis(N-phenylnitrone), p-xylylene dialdehyde bis(N-phenylnitrone), 1,4-cyclohexane dialdehyde bis(N-phenylnitrone), N,N' - bis(benzylidene)p-phenylenediamine-N,N'-bis(oxide), N,N' - bis(benzylidene) - hexamethylenediamine - N,N'-bis(oxide), N,N'-bis(ethylidene)-p-phenylenediamine-N,N'-bis(oxide), p,p'-diisopropionyldiphenylmethane bis(N-p-chlorophenylnitrone), and p,p-diisopropionyldiphenylmethane bis(N-p-methoxyphenylnitrone); dinitrones having formulas in accordance with III, above, such as glyoxal bis(N-phenylnitrone), dimethyl glyoxal bis(N-phenylnitrone), glyoxal bis(N-cyclohexylnitrone), diphenylglyoxal bis(N-phenylnitrone), diphenylglyoxal bis(N - methylnitrone), dioctylglyoxal bis(N - phenylnitrone) and diethylglyoxal bis(N-butylnitrone); and polyfunctional nitrones containing more than two nitrone groups, such as 1,3,5-benzene tricarboxaldehyde tris(N-cyclohexylnitrone), 1,3,5-benzene tricarboxaldehyde tris (N-phenylnitrone), 1,3,5-benzene tricarboxaldehyde tris (N-methylnitrone), hexa(acrolein) hexakis(N-phenylnitrone) and deca(acrolein) decakis(N-phenylnitrone).

Mixtures of two or more of the above polyfunctional nitrones can be used if desired.

The polyfunctional nitrones used herein can be pretion of N,N-disubstituted hydroxylamines; by the reaction of N-substituted hydroxylamines with aldehydes and ketones; by the N-alkylation of aldehyde and ketone oximes; by the thermal rearrangement of oxaziranes; and by the reaction of aromatic nitroso compounds with compounds which have active hydrogen groups. Production of the polyfunctional nitrones used in this invention will be illustrated further by the following examples. All parts are by weight unless otherwise specifically indicated.

Example 1

A mixture of 10.0 parts of terephthalaldehyde, 16.5 parts of N-phenylhydroxylamine and 120 parts ethanol is stirred at room temperature for about 16 hours. A yellow solid results, which is filtered, washed with ethanol and dried. The resulting product is 23.2 parts of terephthalaldehyde bis(N-phenylnitrone). A portion of this product is recrystallized from a mixture of dimethylformamide and water, and has a melting point of 240° C.

Example 2

A mixture of 8.35 parts of a 30% aqueous solution of glyoxal, 9.1 parts of N-phenylhydroxylamine, and 50 parts of water is stirred for one hour at room temperature. A yellow solid forms, which is filtered and recrystalized three times from ethanol. The product is 5.3 parts of glyoxal bis(N-phenylnitrone), and has a melting point of 180° C.

Any type of unsaturated polymer containing ethylenic unsaturation wherein there is at least one hydrogen radical attached to at least one of the carbon atoms of the ethylenic double bond can be cross-linked with the above-described polyfunctional nitrones in accordance with this invention. Examples of suitable polymers include polybutadiene-1,2; polybutadiene-1,4; styrene-butadiene copolymer rubbers; butyl rubber (polyisobutylene-isoprene copolymer rubbers); natural rubber; polyester resins, such as, for example, maleate containing polyesters and polyacrylate esters; butadiene-acrylonitrile copolymers; polyester resins such as polyacrylate ester copolymers; ethylene-propylene-dicyclopentadiene terpolymers; polyether copolymers and terpolymers containing at least one unsaturated epoxide constituent, such as, for example, propylene oxide-allyl glycidyl ether copolymers and ethylene oxide-epichlorohydrin-allyl glycidyl ether terpolymers; polychloroprene; alkyd resins, such as, for example, tall oil alkyd resins; polyisoprene; and mixtures and blends thereof. Polymers containing acetylenic unsaturation can also be cross-linked by the instant process.

The cross-linking is carried out by contacting the unsaturated polymer and a minor amount of the polyfunctional nitrone cross-linking agent for a time sufficient for the desired degree of cross-linking to occur. The amount of polyfunctional nitrone added will depend upon the amount of cross-linking desired. Generally, from about 0.01% to about 50% by weight of the polymer of the nitrone can be used, with from about 0.1% to about 10% being the preferred amount.

Temperatures between about 20° C. and about 200° C. can be utilized in the instant cross-linking reaction. It will thus be appreciated that the reaction mixtures of polymer and the nitrone cross-linking agent can be contacted at about room temperature or can be heated to elevated temperatures. Some heating to temperatures between about 50° C. and about 100° C. is preferred.

The instant polyfunctional nitrone cross-linkers can be brought into contact with the polymer, for example, by milling the two together on a conventional rubber mill, or by dissolving the cross-linker in a solvent solution of the polymer. The polyfunctional nitrone cross-linker will be uniformly distributed throughout the mass of polymer, so that uniform cross-linking can be achieved. Additional procedures for distributing the polyfunctional nitrone uniformly throughout the mass of polymer will be readily apparent to those skilled in the art.

Additional ingredients can also be incorporated in the polymer-polyfunctional nitrone reaction blend, if desired. Common rubber additives such as extenders, fillers, pigments, plasticizers, and stabilizers, for example, can be included. In many cases, the addition of such ingredients will be useful and desirable, while for many other applications only the nitrone cross-linker will be added.

The cross-linked polymers of this invention are hard, tough, resins and are substantially insoluble in water and common hydrocarbon solvents. They exhibit improved tensile properties. These polymers are useful in various rubber applications, such as, as protective and decorative coatings for various substrates, as ingredients of tires for motor vehicles, pipes, tubing and other rubber articles, and the like.

The preparation of the instant cross-linked polymers will be further illustrated by the following specific examples. All parts and percentages referred to therein are by weight unless otherwise specifically indicated. The molecular weight of the polymers used in these examples is indicated by their Reduced Specific Viscosity (RSV). By the term "Reduced Specific Viscosity" is meant the $\eta_{sp}/c$. determined on a 0.1% solution (0.1 gram of the polymer per 100 ml. of solution) of the polymer in solvent at the specified temperature.

Example 3

In this example, 0.05 part of the terephthalaldehyde bis(N-phenylnitrone) produced in Example 1 is uniformly mixed with a solution of 0.5 part of a maleate-isophthalate-propylene glycol polyester resin (1:1 ratio of maleate: isophthalate), (Oronite Resin CR 19583 produced by the Oronite Chemical Co.), [RSV=0.09 in benzene at 25° C.] in 4 parts of acetone. This mixture is allowed to evaporate to dryness at room temperature, and the solid residue is then heated to 90° C. and held at that temperature for 2.5 hours. The resulting product is a hard, tough material, insoluble in acetone.

A control sample subjected to the same procedure except that the polyfunctional nitrone is omitted yields a product which is completely soluble in acetone.

Example 4

A solution of 1.0 part of the maleate-isophthalate-propylene glycol polyester resin used in Example 3 in 4.0 parts of acetone is mixed with 0.1 part of the glyoxal bis (N-phenylnitrone) prepared in Example 2. This mixture is evaporated to dryness at room temperature and then held at 30° C. for 24 hours. The resulting product is substantially insoluble in acetone.

A control sample subjected to the same procedure except that the nitrone is omitted yields a product which is completely soluble in acetone.

Example 5

In this example, 0.05 part of the terephthalaldehyde bis(N-phenylnitrone) prepared in Example 1 is uniformly mixed with a benzene solution of 1.0 part of a propylene oxide-allyl glycidyl ether copolymer rubber (containing 10% by weight allyl glycidyl ether) [RSV=5.2 in benzene at 25° C.]. This mixture is allowed to evaporate to dryness at room temperature, and is then heated to 90° C. and held at that temperature for 5.0 hours. The resulting product is a hard, tough, cross-linked rubber which is substantially insoluble in benzene.

Example 6

A solution of 1.0 part of a propylene oxide-allyl glycidyl ether copolymer rubber (containing 10% by weight allyl glycidyl ether) [RSV=5.2 in benzene at 25° C.] in 30 parts of benzene is mixed with 0.01 part of the terephthalaldehyde bis(N-phenylnitrone) prepared in Example 1. This mixture is allowed to evaporate to dryness at room temperature and then heated to 90° C. for 5.0 hours. The resulting product is a hard, tough, cross-linked rubber which is substantially insoluble in benzene.

Example 7

A solution of 1.0 part of cis-1,4-polybutadiene in 30 parts of benzene [RSV=2.6 in benzene at 25° C.] is mixed with 0.1 part of the glyoxal bis(N-phenylnitrone) prepared in Example 2. This mixture is evaporated to dryness at room temperature and then is heated to 90° C. and held at that temperature for 2.0 hours. The resulting product is a hard, tough, cross-linked rubber, which is insoluble in chloroform.

A control sample which is subjected to an identical procedure, except that the nitrone is not present, yields a product which is completely soluble in chloroform.

Example 8

A mixture of 10.0 parts of 1,4-cyclohexane dialdehyde, 17.0 parts of N-phenylhydroxylamine and 150 parts of water is stirred at room temperature for about 8 hours. A pale yellow solid results, which is filtered, washed with water and dried. The resulting product is 19.3 parts of 1,4-cyclohexane dialdehyde bis(N-phenylnitrone).

Analysis.—Calculated for $C_{20}H_{22}N_2O_2$: C, 74.50; H, 6.88. Found: C, 74.62; H, 6.79.

A solution of 0.05 part of the 1,4-cyclohexane dialdehyde bis(N-phenylnitrone) is mixed with a solution of one part of the maleate-isophthalate-propylene glycol polyester resin used in Example 3 in five parts of acetone. This mixture is allowed to evaporate to dryness at room temperature, and the solid residue is then heated to 85° C. and held at that temperature for 2 hours. The resulting product is insoluble in acetone.

A control sample subjected to the same procedure, except that the nitrone is omitted, yields a product which is completely soluble in acetone.

Example 9

A mixture of 10.0 parts of 1,3,5-benzene tricarboxaldehyde, 35 parts of N-cyclohexylhydroxylamine and 200 parts of ethanol is stirred at room temperature for about 20 hours. A pale yellow solid precipitates, and then is filtered, washed with ethanol and dried. The result is 25 parts of 1,3,5-benzene tricarboxaldehyde tris(N-cyclohexylnitrone).

Analysis.—Calculated for $C_{27}H_{39}N_3O_3$: C, 71.49; H, 8.67. Found: C, 71.38; H, 8.74.

A solution of 0.005 part of this tris(nitrone) is mixed with a solution of one part of propylene oxide-allyl glycidyl ether copolymer rubber (containing 10% by weight allyl glycidyl ether, RSV=5.2 in benzene at 25° C.) in 20 parts of benzene. This mixture is allowed to evaporate to dryness at room temperature and is then heated to 90° C. and held at that temperature for 5.5 hours. The resulting product is substantially insoluble in benzene.

Example 10

A mixture of 10.0 parts of p-phenylene dihydroxylamine, 16.0 parts of benzaldehyde and 200 parts of water is stirred at room temperature for 24 hours. The solid which forms is filtered, washed with water and then recrystallized from a mixture of dimethylformamide and water to yield 15.2 parts of N,N'-bis(benzylidene)-p-phenylenediamine-N,N'-bis(oxide).

Analysis.—Calculated for $C_{20}H_{16}N_2O_2$: C, 75.93; H, 5.10. Found: C, 76.00; H, 5.19.

A solution of 1.0 part of the polyester resin used in Example 3 [RSV=0.09 in benzene at 25° C.] in 4.5 parts of acetone is mixed with 0.05 part of this bis(nitrone). This mixture is evaporated to dryness at room temperature and then heated at 90° C. for 1.0 hour. The resulting product is substantially insoluble in acetone.

Example 11

To a solution of 25 parts of epichlorohydrin-ethylene oxide-allyl glycidyl ether terpolymer (60–32–8 weight percents, RSV=4.8 in α-chloronaphthalene at 100° C.) in 75 parts of dioxane is added 0.257 part of glyoxal bis-(N-phenylnitrone). The resulting solution is then poured in a thin stream into a large amount of water. The rubber which precipitates is then heated in an oven at 140° C. for 10 minutes. The resulting product is insoluble in dioxane.

What I claim and desire to protect by Letters Patent is:

1. The process of cross-linking unsaturated polymers containing ethylenic unsaturation wherein there is at least one hydrogen radical attached to at least one of the carbon atoms of the ethylenic double bonds which comprises uniformly contacting an unsaturated polymer with from about 0.01% to about 50% by weight of the polymer of a polyfunctional nitrone having the formula selected from the group consisting of I.
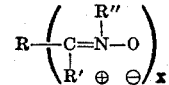

II.
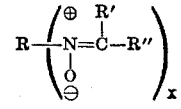

and

III.
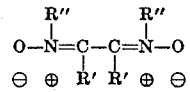

wherein R is a radical selected from the group consisting of alkylene, cycloalkylene, arylene, arylene-dialkylene, alkylene-diarylene, cycloalkylene-dialkylene and arylene-dicarbonyl; R' is a radical selected from the group consisting of hydrogen, alkyl, aryl, alkaryl and aralkyl; R" is a radical selected from the group consisting of alkyl, aryl, alkaryl and aralkyl; and x is an integer from 2 to 10 at a temperature of from about 20° C. to about 200° C.

2. The process of claim 1 wherein the polyfunctional nitrone has the formula:

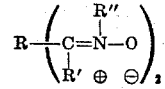

3. The process of claim 2 wherein the polyfunctional nitrone is terephthalaldehyde bis(N-phenylnitrone).

4. The process of claim 2 wherein the polyfunctional nitrone is 1,4-cyclohexane dialdehyde bis(N-phenylnitrone).

5. The process of claim 1 wherein the polyfunctional nitrone is glyoxal bis(N-phenylnitrone).

6. The process of claim 1 wherein the polyfunctional nitrone is 1,3,5-benzene tricarboxaldehyde tris(N-cyclohexylnitrone).

7. The process of claim 1 wherein the polyfunctional nitrone is N,N'-bis(benzylidene)-p-phenylenediamine-N,N'-bis(oxide).

8. The process of claim 1 wherein the polyfunctional nitrone is present in an amount between about 0.01% and about 50% by weight of said polymer.

9. The process of claim 1 wherein the polyfunctional nitrone and the polymer are contacted at a temperature between about 20° C. and about 200° C.

10. The process of claim 1 wherein the polyfunctional nitrone is present in an amount between about 0.1% and about 10% by weight of said polymer, and said nitrone and said polymer are contacted at a temperature between about 50–100° C.

11. An unsaturated polymer containing ethylenic unsaturation wherein there is at least one hydrogen radical attached to at least one of the carbon atoms of the ethylenic double bonds cross-linked with a polyfunctional nitrone having the formula selected from the group consisting of:

I.
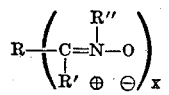

II.
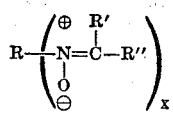

and

III.
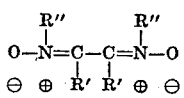

wherein R is a radical selected from the group consisting of alkylene, cycloalkylene, arylene, arylene-dialkylene, alkylenediarylene, cycloalkylene-dialkylene, and arylene-dicarbonyl; R' is a radical selected from the group consisting of hydrogen, alkyl, aryl, alkaryl and aralkyl; R'' is a radical selected from the group consisting of alkyl, aryl, alkaryl and aralkyl; and $x$ is an integer from 2 to 10.

12. The product of claim 11 wherein the unsaturated polymer is polybutadiene.

13. The product of claim 11 wherein the unsaturated polymer is an unsaturated polyester resin.

14. The product of claim 11 wherein the unsaturated polymer is a copolymer of an ethylenically unsaturated epoxide and at least one other epoxide.

15. The product of claim 14 wherein said copolymer is a copolymer of propylene oxide and allyl glycidyl ether.

16. The product of claim 14 wherein said copolymer is an epichlorohydrin-ethylene oxide-allyl glycidyl ether terpolymer.

No references cited.

WILLIAM H. SHORT, *Primary Examiner.*

R. T. LYON, *Assistant Examiner.*

UNITED STATES PATENT OFFICE
CERTIFICATE OF CORRECTION

Patent No. 3,390,133                                      June 25, 1968

David S. Breslow

It is certified that error appears in the above identified patent and that said Letters Patent are hereby corrected as shown below:

Column 3, line 6, after "pre-" insert -- pared in various ways such as, for example, by the oxida- --.

Signed and sealed this 18th day of November 1969.

(SEAL)
Attest:

Edward M. Fletcher, Jr.                        WILLIAM E. SCHUYLER, JR.
Attesting Officer                                     Commissioner of Patents